US008430146B2

(12) United States Patent
Ferrone

(10) Patent No.: US 8,430,146 B2
(45) Date of Patent: Apr. 30, 2013

(54) METHOD OF PLACING INSERTS INTO A WEB PRESS PRODUCT USING A SYNCHRONIZED WEB-PRESS INSERT PLACING UNIT

(75) Inventor: Rock A Ferrone, Tarentum, PA (US)

(73) Assignee: AD-A-Note, Cheswick, PA (US)

( * ) Notice: Subject to any disclaimer, the term of this patent is extended or adjusted under 35 U.S.C. 154(b) by 362 days.

(21) Appl. No.: 12/650,239

(22) Filed: Dec. 30, 2009

(65) Prior Publication Data

US 2010/0163171 A1 Jul. 1, 2010

Related U.S. Application Data

(60) Provisional application No. 61/141,445, filed on Dec. 30, 2008.

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ............................ 156/521; 156/557; 156/264

(58) Field of Classification Search .................. 156/264, 156/270, 521, 364, 557, 277
See application file for complete search history.

(56) References Cited

U.S. PATENT DOCUMENTS 3,995,555 A 12/1976 Stewart
4,289,562 A * 9/1981 Chisolm ...................... 156/364
5,127,676 A 7/1992 Bockairo
5,290,616 A 3/1994 Cowan et al.
5,730,831 A * 3/1998 Jensen et al. .................. 156/475
6,027,780 A 2/2000 Treleaven et al.
6,270,121 B1 8/2001 Dolan et al.
6,329,034 B1 12/2001 Pendry et al.
6,729,376 B1 * 5/2004 Kakinuma et al. ............ 156/521
6,749,228 B2 6/2004 Takemura

OTHER PUBLICATIONS

Noteads, Sticky Note Advertising, www.noteads.com/super_sticky_notes.htm , Copyright © 2010.
Hurletron, ElectroCard® 3G Specification, http://www.hurletron.com/pdf/brochures/Ecard_Specs.pdf.
Kirk-Rudy, KR 215 Post-It® Note Attaching System, http://www.kirkrudy.conn/products/kr_215_post_it_note.htm, Copyright 2011.

* cited by examiner

*Primary Examiner* — Linda L Gray
(74) *Attorney, Agent, or Firm* — Blynn L. Shideler; Krisanne Shideler; BLK Law Group

(57) ABSTRACT

An apparatus provides for a method of placing inserts onto a web press product comprising the steps of: Supplying a continuous web of inserts in the form of a roll mounted on the core receiving structure of insert storage mechanism; Pulling the continuous web of inserts from the roll 8 with the delivery mechanism; Shearing the continuous web of inserts of the roll 8 into individual inserts with the knife assembly; and Placing the individual inserts onto the web press product prior to the end of the web press product line via the delivery conveyor. Synchronizing the placement of the individual sheets onto the web press product with the speed of the web press is also performed.

13 Claims, 1 Drawing Sheet

METHOD OF PLACING INSERTS INTO A WEB PRESS PRODUCT USING A SYNCHRONIZED WEB-PRESS INSERT PLACING UNIT

RELATED APPLICATIONS

The present application claims the benefit of provisional patent application Ser. No. 61/141,445 filed Dec. 30, 2008 entitled "A Method of Placing Inserts into a Web Press Product Using a Synchronized Web-Press Insert Placing Unit."

BACKGROUND OF THE INVENTION

1. Field of the Invention

The present invention relates to web press accessories, in particular to a method and apparatus for placing inserts, such as adhesive backed note cards, into a web press product, such as a newspaper, before the end of the web press.

2. Background Information

Web Press Background

A web press prints on continuous rolls of paper, or possibly other substrates. Some web presses can print on both sides of the paper at the same time. These generally consist of several connected units for printing different colors of ink and doing cutting, folding, and punching. High-speed commercial web presses use wide rolls of paper for newspapers, books, etc. and use heat to set the ink (heat-set web). Small or cold-set web presses handle lower volume printing of forms, direct mail, and smaller publications with paper roll widths as little as 11 inches.

Newspaper web presses can occupy several floors and contain multiple 4-color and single color printing units as well as a variety of folding sections to handle the different sections of the paper.

Newspapers and other periodicals represent a significant amount of material produced on web presses. The operation and construction of web presses is well known in the art.

Newspapers in particular have experienced significant continued declining readership in recent years that has been attributed to many sources, commonly now blamed on the public's reliance upon on-line news and entertainment sources. There are numerous article detailing this decline and even a Website, http://www.newspaperdeathwatch.com/, dedicated to "chronicling the decline of newspapers".

This declining readership base has placed a significant strain on newspaper advertising income, which, of course, is directly coupled to the amount of circulation of the paper.

A few definitions within the meaning of this application may be helpful for a clearer understanding of the present application. A "web press product" within the meaning of this application is a product that is printed on a conventional web press. An insert as used herein is an item that is attached to or inserted within a web press product, with the insert not being printed on the web press producing the web press product. The term "insert" comes from earlier newspaper days when advertising sections were commonly manually inserted into sections of a web press product, namely a newspaper, after the web press product left the web press. Separate insertion machines are now commonly used for insertion of inserts downstream of the web press.

Improving the advertisement found in web press products has been an area of interest for some time. U.S. Pat. No. 3,995,555 discloses a method and apparatus for forming removable coupons within the web press product.

Sticky Note Inserts

One current bright spot in the advertising arena of the newspaper industry has been the popularity of adhesive backed inserts, generally called "sticky notes," commonly attached to the front or rear cover of the newspaper. For example, www.noteads.com/super sticky notes.htm identifies that "Post-it® brand sticky note advertising allows a newspaper to create a new line of revenue by offering a unique form of advertising that sticks out" and it is assumed that the double entendre is intended here. It is described as the "one form of newspaper advertising that is easy to sell". These are also available from a company called A-1 Notes. The term inserts within the meaning of this application also covers items that are "affixed to" the web press product, such as the adhesive backed sticky notes. A sticky note, such as the Post It® brand sticky note, is an insert when it is intended to be attached to a web press product.

These newspaper sticky notes have proven to be a very popular, but they have also resulted in a number of complaints. Wayne Ezell a writer for the Times-Union discussed these deficiencies in an article Jun. 1, 2008. This article noted that although these "sticky notes that appear atop the front page [of the newspaper] get a lot of attention—and they generate reader complaints." For example, the conventional 3-inch-by-3-inch square sticky notes, Mr. Ezell elaborated, "often obscure parts of carefully crafted headlines and stories, somewhat to the chagrin of journalists who think of the front page as sacred ground. Worse, when readers try to peel them off, the newspaper sometimes tears right through the headline."

This advertising trend of sticky note advertising for newspapers began in the years following the widespread marketing of Post-it® brand sticky notes that began in about 1980. At first carriers affixed sticky notes in a slow and expensive effectively manual process. Newspapers began to use the notes more often as automated equipment for affixing the inserts at the web press became available. A fold-out version allows a company to offer several pages of advertising on one front-page sticky note. Other versions include customer loyalty cards, sports schedules and even jumbo sizes. The notes will be found occasionally on section fronts inside the paper.

The automated machines for attaching sticky notes to a web press product before the end of the web press, i.e. at the web press, are responsible for the increasing acceptance of this form of advertising. See for example the ELECTRO-CARD® 3G product from Hurletron that bursts a perforated web of adhesive backed cards, see http://www.hurletron.com/pdf/brochures/Ecard Specs.pdf.

Kirk Rudy, Inc. recently introduced a KR 215 POST IT® NOTE ATTACHING SYSTEM that is allegedly capable of 18,000 pieces per hour in a complex, expensive assembly, see http//www.kirkrudy.com/products/kr 215 post it note.htm.

However the existing machines have a number of drawbacks. First they are currently limited to front and rear page placement, and only at certain locations thereon. Further the running of these types of machines is labor intensive due to the feeding requirements of the sticky notes insert product. Further, many existing sticky note insert products use release sheets which generates substantial scrap material that must be disposed of increasing the labor and underlying product costs for the inserts.

Analogous Prior Art Patent

In a somewhat related background, U.S. Pat. No. 5,127,676 discloses an adhesive label having a folded leaflet, coupon or the like disposed between a base sheet and a cover sheet. The cover sheet is wider than the folded leaflet, having side edges adhered to the base sheet. The cover sheet has at least one edge extending outwardly beyond the ends of the sides edges so as to form tabs which are readily grasped for peeling away the cover sheet for access to the leaflet. The label is disclosed in circular and rectangular embodiments. The end areas of the cover sheet side edges may be tapered to reduce the possibility of tearing the cover sheet.

In a somewhat related disclosure, U.S. Pat. No. 5,290,616 discloses a re-sealable, over-laminated leaflet label having a folded leaflet overlaid by a cover sheet having opposed marginal portions extending beyond the edges of the leaflet. The undersurface of the cover sheet is coated with peelable adhesive material such that the marginal portions are peelably adhered to the surface of an article with the leaflet disposed between the article and the cover sheet.

Similarly in a related disclosure, U.S. Pat. No. 6,027,780 discloses a label product including a release liner having an upper surface and a booklet disposed on the upper surface of the release liner. A layer of adhesive is interposed between the bottom panel and the upper surface of the release liner.

In a generally related disclosure, U.S. Pat. No. 6,270,121 discloses a brochure assembly with a product information patch removably attached to one of the panels. The product information patch includes a base label secured to the primary brochure, a folded product information sheet positioned centrally on the base label and an over-laminate secured over the folded product information sheet and the base label.

In a related disclosure, U.S. Pat. No. 6,329,034 discloses self-adhesive label for displaying information includes a leaflet, a tab member, and an adhesive layer. The label may include a laminate cover overlying the upper surface of the leaflet and including a laminate tab portion overlying the exposed portion of the tab member.

In a related disclosure, U.S. Pat. No. 6,749,228 discloses a promotional card that is provided with an informational booklet or the like removably or permanently adhered to a face of the promotional card such that the card may be inserted by a high speed insertion process into a machine that inserts the card into a multi-page article.

There remains a need in the industry to provide a web press accessory for attaching or placing inserts, such as sticky notes, into a web press product before the end of the web press in an economical fashion.

SUMMARY OF THE INVENTION

The above object is achieved with the embodiments according to this invention, which in one non-limiting embodiment of the present invention provides a synchronized web-press insert placing unit configured to place inserts onto a web press product. The unit comprises an insert storage mechanism configured to store a continuous web of inserts; an insert web delivery mechanism coupled to the insert storage mechanism and configured to receive a continuous insert web from the insert storage mechanism; an insert shearing knife assembly coupled to the insert web delivery mechanism and configured to sever the insert web into individual inserts; an insert delivery conveyor coupled to the knife assembly and configured to receive individual inserts formed by the insert shearing knife and place individual inserts into or onto the web press product; and a synchronizing assembly coupled to the web press configured for synchronizing the unit with the web press.

In one non-limiting embodiment of the invention, the insert storage mechanism is configured to receive a roll forming the continuous web of inserts. Further, the roll may include an adhesive strip formed along a rear surface of the continuous web of inserts.

In one non-limiting embodiment of the invention, the insert storage mechanism, the insert delivery conveyor, the insert shearing knife assembly and the synchronizing assembly may be attached to a common frame and the frame maybe a common mobile frame having ground engaging rollers on the frame for moving of the frame. The insert delivery conveyor may be formed as to be adjustable relative to the common frame, whereby the insert delivery conveyor is adjustable relative to the web press wherein an angle between a direction of travel of the inserts on the insert delivery conveyor and the direction of travel of the web press products at the point that the insert is placed on the web press product is adjustable.

In one non-limiting embodiment of the invention, the unit may further include adjustment mechanisms to adjust the relative position of each insert on the associated web press product. In another embodiment of the invention, the unit may further include a right angle conveyor forming at least part of the insert delivery conveyor.

One aspect of the present invention provides a method of placing inserts onto a web press product comprising the steps of: supplying a continuous web of inserts in the form of a roll; pulling the continuous web of inserts from the roll; shearing the continuous web of inserts into individual inserts; placing the individual inserts onto the web press product prior to the end of the web press product line. In one non-limiting aspect of the invention, the placing of the individual inserts onto the web press product places each individual insert on an interior page of the web press product.

In one embodiment of the invention, the individual inserts include an adhesive backing on at least a part of a rear surface thereof and wherein the roll of continuous web of inserts is free of a release sheet or release sheeting.

One aspect of the present invention provides a method of supplying inserts for a web press product, wherein the inserts are sheared into individual inserts and placed onto the web press product prior to the end of the web press product line, the method comprising the steps of: printing inserts on a continuous roll; forming a continuous adhesive strip on the continuous roll of inserts; and supplying the adhesive backed continuous roll of inserts to a synchronized web-press insert placing unit.

These and other advantages of the present invention will be clarified in the description of the preferred embodiments taken together with the attached drawings.

BRIEF DESCRIPTION OF THE DRAWINGS

Other objects and advantages appear in the following description and claims. The enclosed drawing illustrates one practical embodiment of the present invention, without intending to limit the scope of the invention or the included claims.

DESCRIPTION OF THE PREFERRED EMBODIMENTS

Figure 1:
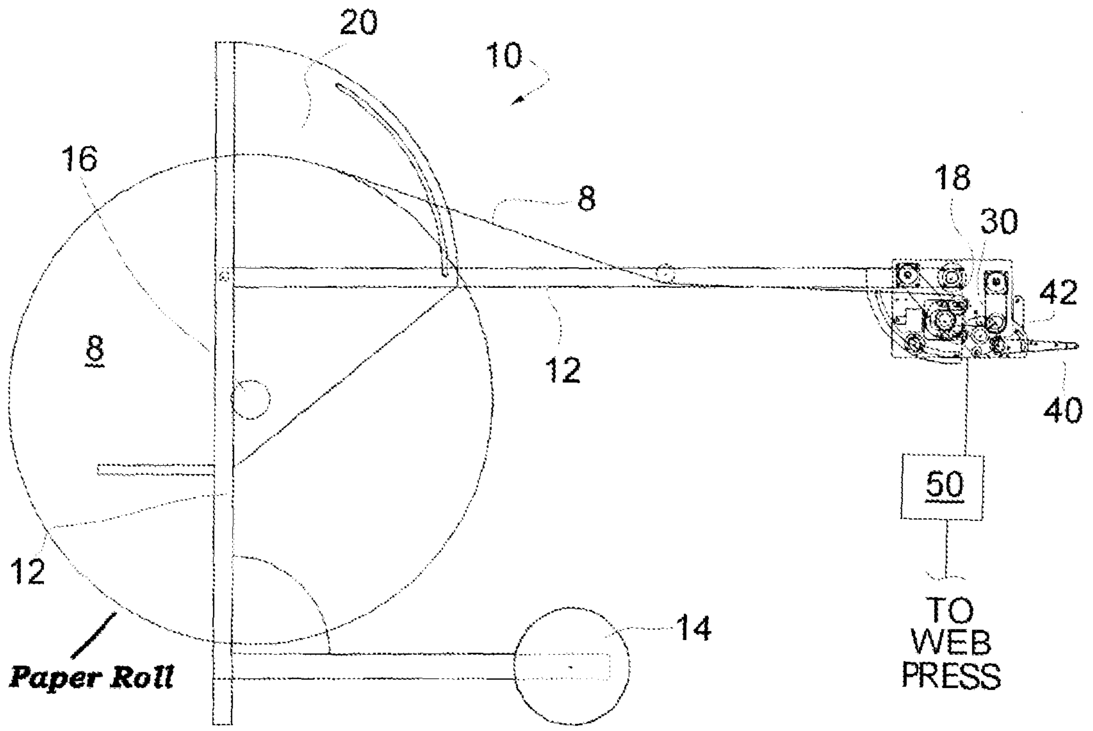
FIG. 1 is a side elevation schematic view of synchronized web-press insert placing unit configured to place inserts onto a web press product according to one non-limiting embodiment of the present invention and for implementing the methods according to one aspect of the present invention.
Figure 2:
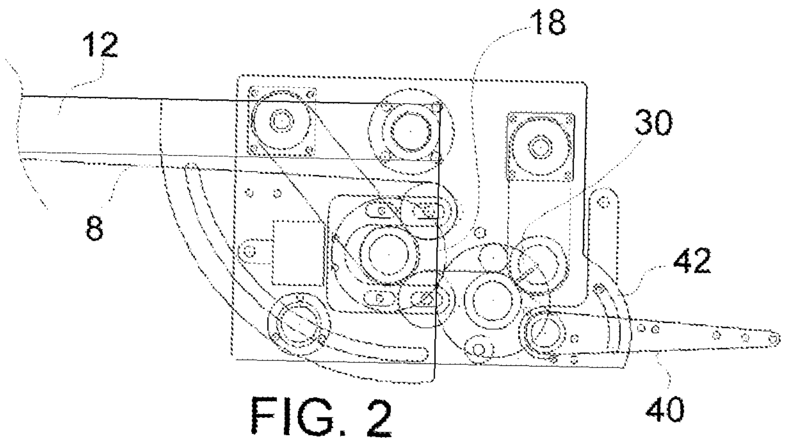
FIG. 2 is an enlarged side elevation view of a portion of the synchronized web-press insert placing unit of FIG. 1.

FIGS. 1 and 2 show an embodiment that is preferred for its simplicity of construction of a synchronized web-press insert placing unit 10 configured to place inserts, such as adhesive backed "sticky notes", onto a web press product before the end of the web press. The construction of web presses is known to those of ordinary skill in the art and not detailed herein.

Frame 12

The synchronized web-press insert placing unit 10 is formed on a frame 12 that is mounted on rollers, namely wheels 14. A tubular skeletal frame 12 as shown keeps the unit 10 compact and easily portable, however a box frame housing arrangement is certainly also possible. The wheels 14 are lockable, or retractable as an alternative, to allow the unit 10 to be held in the desired position relative to the web press, not shown. The portable aspect of the unit 10 is important as it allows users to move the unit 10 to the desired web press and implement the unit 10 where and as desired.

In an alternative embodiment the frame 12 includes mounting brackets to support the unit 10 to an associated mount, such as beam or support of the web press. In this alternative the frame 12 need not form a stand and can be more compact, however it requires an appropriate mounting surface in proximity of the final insert delivery position on the associated web press.

Insert Storage Mechanism 16

An insert storage mechanism 16 is formed on the frame 12 and is configured to store a continuous web of inserts, in the form of roll 8. In the embodiment shown the mechanism 16 is a mount for the core of the roll 8 positioned to allow for clearance of the maximum sized roll 8 of inserts that is contemplated. Typically the maximum sized roll 8 will be less than 48".

The roll 8 form of the continuous web of inserts is believed to be far more efficient than other formats, such as an accordion folded stack (e.g., similar to older computer paper reams), however the unit could accommodate other desired formats of the continuous web of inserts if desired.

It should be apparent that the "continuous web" of inserts within the meaning of this application defines that the insert products are supplied in a condition that multiple inserts are attached together in the original format and must be separated before application. The "continuous web" of inserts will have a lead end and a terminal end and is not intended to suggest an endless supply or web of inserts.

Insert Web Delivery Mechanism 18

An insert web delivery mechanism 18 is coupled to the frame 12 coupled to the insert storage mechanism 16 and configured to receive a continuous insert web 8 from the insert storage mechanism 18. The delivery mechanism 18 is in the form of tension rollers and pinch rollers driven by motors that are controlled by a controller 50 discussed below. The insert web delivery mechanism 18 can also be called web delivery conveyor and extends far enough from the insert storage mechanism 16 to accommodate the largest roll 8. The insert web delivery mechanism is coupled to the roll 8 thus forming a roll unwinding unit on the frame 12 which unwinds the roll 8.

The unit 10 includes an adjustment mechanism 20 for adjusting the relative position of the delivery mechanism 18 to allow the unit 10 to be properly positioned adjacent the web press, and to accommodate different positions of the unit 10 adjacent a variety of web press designs. The adjustment mechanism 20 allows for angular positioning of an arm of the frame 12, as shown.

Insert Shearing Knife Assembly 30

The unit 10 includes an insert shearing knife assembly 30 attached to the frame 12 and in the form of a rotary knife driven by a motor controlled by controller 50, as shown. The knife assembly 30 is coupled to the insert web delivery mechanism 18 and receives the web 8 there from and is configured to sever the insert web 8 into individual inserts.

Other knife arrangements could be used such as fast acting linear shearing blades, but the rotary knife as shown is a particularly cost effective and efficient shearing mechanism.

Insert Delivery Conveyor 40

An insert delivery conveyor 40 is attached to the frame and is coupled to the knife assembly 30 and configured to receive individual inserts formed by the insert shearing knife assembly 30 and place individual inserts onto the web press product at the distal end of the conveyor 40. The construction and operation of the conveyor 40 is similar to other non-slip conveyors used in the web press art, and typically includes belts or rollers for engaging and moving the product in a controlled fashion.

With the use of the knife assembly 30, the conveyor 40 does not need to operate at a differential speed, such as required for burst separation of the inserts on the web. Consequently, the speed and control of the conveyor 40 is simple. The conveyor is controlled through system controller 50.

The unit 10 includes an adjustment mechanism 42 for adjusting the relative position of the conveyor 40 to allow the unit 10 to be properly positioned adjacent the web press, and to accommodate different positions of the unit 10 adjacent a variety of web press designs. The adjustment mechanism 42 allows for angular positioning of body of the conveyor 40. With the insert delivery conveyor 40 adjustable relative to the frame 12, the conveyor 40 is also adjustable relative to the fixed web press, whereby an angle between a direction of travel of the inserts on the insert delivery conveyor 40 and the direction of travel of the web press products at the point (the delivery location at the terminal end of the conveyor 40) that the insert is placed on the web press product is adjustable. The adjustment mechanism 20 also can assist in obtaining the desired relative positioning.

The conveyor 40 can be formed with a number of conveying path configurations, as desired. It may be advantageous for web presses with minimal floor room in line with the press, to have one or two right angle delivery paths formed in the conveyor 40 to allow for offset positioning of the unit 10 relative to the web press. In this embodiment the inserts will be delivered, at least for some period, perpendicular to the web press product line movement path.

In a further anticipated embodiment a longitudinally extending conveyor structure (e.g. a boom) for the delivery conveyor 40 can be used to add even greater placement flexibility to the unit 10.

Synchronizing Assembly 50

The unit 10 includes a synchronizing assembly 50 coupled to the web press configured for synchronizing the unit 10 with the web press. The synchronizing unit 50 will be incorporated into the control for the unit 50 and thus the synchronizing assembly 50 can be referenced as the controller 50 as well.

The synchronizing assembly 50 will utilize encoders, product identifying sensors (e.g. beam breaking sensor), or the like for matching the delivery speed of the inserts with the web press products. Further the synchronizing assembly can be used to adjust the timing to adjust where the insert is positioned on the receiving page of the web press product. For example adding an extra delay will shift the insert position down on the associated web product page and speeding the delivery conveyor up for a short period (the adjustment period) will move the insert placement up on the receiving web product page. Physical movement of the delivery conveyor can accommodate left and right adjustment, although such positioning can be through an adjustment set screw.

The controller can be placed on the frame 12, or in a stand alone location, such as on the web press machine. The user interface of a controller 50 is believed to be known to one of ordinary skill in the art. In addition to start and stop controls and the position shifting the controller will likely keep track of and display operating speeds and the numbers of inserts supplied for a given run.

Operation

The unit 10 provides for a method of placing inserts onto a web press product comprising the steps of: Supplying a continuous web of inserts in the form of a roll 8 mounted on the core receiving structure of insert storage mechanism 16; Pulling the continuous web of inserts from the roll 8 with the delivery mechanism 18; Shearing the continuous web of inserts of the roll 8 into individual inserts with the knife assembly 30; and Placing the individual inserts onto the web press product prior to the end of the web press product line via the delivery conveyor 40. The present invention provides the step of synchronizing the placement of the individual sheets onto the web press product with the speed of the web press.

One particularly advantageous application of the present invention is where the individual inserts include an adhesive backing on at least a part of a rear surface thereof. The adhesive backing may be formed as an adhesive strip formed along a rear surface of the continuous web of inserts and wherein the roll of continuous web of inserts is free of a release sheet or sheeting.

The simplicity of the construction of unit 10 allows for great speed and procession for the placement of the inserts on the web press product. Consequently the inserts are not limited to the front and rear page of the assembled product as existing similar sticky note application systems are. Thus with the unit 10 the placing of the individual inserts onto the web press product may be on an interior page of the web press product.

Although the present invention has been described with particularity herein, the scope of the present invention is not limited to the specific embodiments disclosed. It will be apparent to those of ordinary skill in the art that various modifications may be made to the present invention without departing from the spirit and scope thereof. The scope of the invention is not to be limited by the illustrative examples described above. The scope of the present invention is defined by the appended claims and equivalents thereto.

What is claimed is:

1. A synchronized web-press insert placing unit configured to place inserts onto a web press product, the unit comprising:

An insert storage mechanism configured to store a continuous web of inserts;

An insert web delivery mechanism coupled to the insert storage mechanism and configured to receive the continuous insert web from the insert storage mechanism;

An insert shearing knife assembly coupled to the insert web delivery mechanism and configured to sever the insert web into individual inserts;

An insert delivery conveyor coupled to the knife assembly and configured to receive individual inserts formed by the insert shearing knife and place individual inserts onto a web press product on a web press; and A synchronizing assembly coupled to the web press configured for synchronizing the unit with the web press.

2. The synchronized web-press insert placing unit according to claim 1, wherein the insert storage mechanism is configured to receive a roll forming the continuous web of inserts.

3. The synchronized web-press insert placing unit according to claim 1, wherein the insert storage mechanism, the insert delivery conveyor, the insert shearing knife assembly and the synchronizing assembly are attached to a common frame.

4. The synchronized web-press insert placing unit according to claim 1, wherein the insert storage mechanism, the insert delivery conveyor and insert shearing knife assembly are attached to a common mobile frame having ground engaging rollers on the frame for moving of the frame.

5. The synchronized web-press insert placing unit according to claim 1, wherein the insert storage mechanism, the insert shearing knife assembly and the insert delivery conveyor, are attached to a common frame, and wherein the insert delivery conveyor is adjustable relative to the common frame.

6. The synchronized web-press insert placing unit according to claim 1, wherein the insert delivery conveyor is adjustable relative to the web press whereby an angle between a direction of travel of the inserts on the insert delivery conveyor and the direction of travel of the web press products at the point that the insert is placed on the web press product is adjustable.

7. The synchronized web-press insert placing unit according to claim 1, wherein the insert storage mechanism is configured to receive a roll forming the continuous web of inserts with an adhesive strip formed along a rear surface of the continuous web of inserts.

8. The synchronized web-press insert placing unit according to claim 1, further including adjustment mechanisms to adjust the relative position of each insert on the associated web press product.

9. The synchronized web-press insert placing unit according to claim 1, further including a right angle conveyor forming at least part of the insert delivery conveyor.

10. A method of supplying inserts for a web press product on a web press, wherein the inserts are sheared into individual inserts and placed onto the web press product prior to the end of the web press product line, the method comprising the steps of:

Printing inserts on a continuous roll;

Forming a continuous adhesive strip on the continuous roll of inserts; and

Supplying the adhesive backed continuous roll of inserts to a synchronized web-press insert placing unit wherein the inserts are sheared into individual inserts and placed onto the web press product prior to the end of the web press product line.

11. The method of supplying inserts for a web press product of claim 10 wherein the adhesive strip is a continuous adhesive strip on the roll of the continuous web of inserts and wherein the roll of continuous web of inserts is free of a release sheet.

12. The method of supplying inserts for a web press product of claim 10 wherein the insert storage mechanism configured to store a continuous web of inserts;

An insert web delivery mechanism coupled to the insert storage mechanism and configured to receive a continuous insert web from the insert storage mechanism;

An insert shearing knife assembly coupled to the insert web delivery mechanism and configured to sever the insert web into individual inserts;

An insert delivery conveyor coupled to the knife assembly and configured to receive individual inserts formed by the insert shearing knife and place individual inserts onto the web press product; and A synchronizing assembly coupled to the web press configured for synchronizing the unit with the web press.

13. The method of supplying inserts for a web press product of claim 10, wherein the roll of continuous web of inserts is free of a release sheet.

* * * * *